Sept. 11, 1956     J. K. RUSSELL     2,762,433
APPARATUS FOR PERFORATING A STRIP OF FILTER
MATERIAL FOR USE IN A FILTER ELEMENT
Filed July 11, 1952
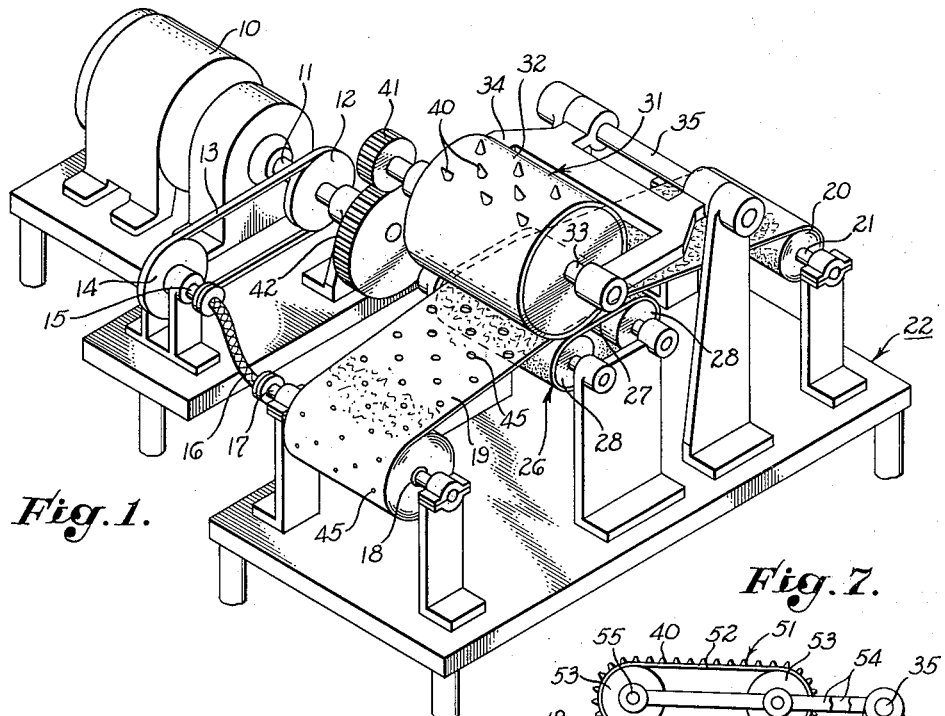
Fig.1.
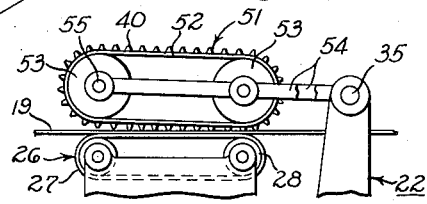
Fig.7.
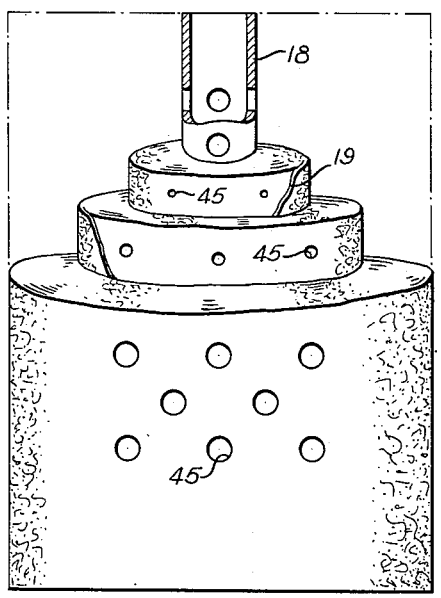
Fig.5.
Fig.2. Fig.3. Fig.4.
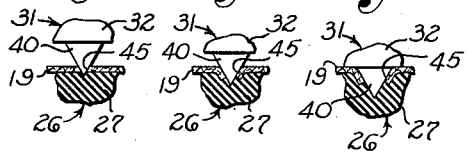
Fig.6.
INVENTOR.
JOHN K. RUSSELL
BY HIS ATTORNEYS.
HARRIS, KIECH, FOSTER & HARRIS United States Patent Office 2,762,433
Patented Sept. 11, 1956

2,762,433

APPARATUS FOR PERFORATING A STRIP OF FILTER MATERIAL FOR USE IN A FILTER ELEMENT

John K. Russell, Los Angeles, Calif., assignor to Luber-Finer Incorporated, Los Angeles, Calif., a corporation of California Application July 11, 1952, Serial No. 298,383

9 Claims. (Cl. 164—99)

The present invention relates to a filter element and to a method of and apparatus for manufacturing the element, the filter element of the invention preferably being of the removable cartridge type customarily employed in the lubrication systems of internal combustion engines, or other installations, although it may be of any desired type and may be employed for filtering liquids other than lubricating oils.

A primary object of the invention is to provide a filter element which includes a tubular roll of filter material through which the liquid being filtered flows along generally radial paths, the convolutions of the roll being provided with perforations therethrough which progressively decrease in size in the direction of flow of the liquid being filtered. In other words, the perforations are large at the upstream ends of the flow paths and progressively decrease in size toward the downstream ends thereof in a uniform manner, the perforations attaining their smallest dimensions at the downstream ends of the flow paths. The largest perforations may be located in either the outer peripheral surface of the tubular roll, or in the inner peripheral surface thereof, depending upon whether the liquid being filtered flows radially inwardly, or outwardly.

With the foregoing construction, the filter element is provided with large spaces or voids for the reception of foreign matter, or other material to be removed from the liquid being filtered, at the upstream ends of the flow paths, such voids or spaces progressively decreasing in size toward the downstream ends of the flow paths as the quantity of foreign matter or other material in the liquid decreases, which is an important feature of the invention. The perforations are preferably arranged in parallel rows which extend lengthwise of the spiral convolutions of the tubular roll forming the filter element, and are preferably so arranged that the center-to-center spacings of the perforations in each spiral row are at least substantially equal. With this construction, as the voids or spaces for foreign matter or other material progressively decrease in size toward the downstream ends of the flow paths, the filtering efficiency progressively increases because of the progressively increasing separations between the perforations as they decrease in size. Expressed differently, the filter element of the invention has a large capacity for foreign matter and a relatively low filtering efficiency at the upstream ends of the generally radial flow paths, and has a low capacity for foreign matter and a relatively high efficiency at the downstream ends of the flow paths, the capacity for foreign matter progressively decreasing and the filtering efficiency progressively increasing in the direction of flow in a uniform manner, which are important features of the invention.

Another object of the invention is to provide a filter element which is formed by winding into a tubular roll a strip of filter material having formed therein parallel rows of perforations which progressively increase in size from one end of the strip to the other and which have at least substantially uniform center-to-center spacings, the strip being wound into a tubular roll in such a manner that the largest perforations are at the upstream ends of the generally radial flow paths. In other words, if the flow through the filter element is to be from the outside toward the center, the perforated strip is wound in such a manner as to place the largest perforations on the outside, this situation being reversed if it is desired to have the flow of liquid being filtered in the opposite direction.

Another object of the invention is to provide a method of making a filter element which involves forming parallel rows of perforations in a strip of filter material in which the perforations of each row have at least substantially uniform center-to-center spacings and progressively increase in size from one end of the row to the other, the perforated strip subsequently being wound into a tubular roll, preferably by winding it around a tubular, perforated core, or the equivalent.

Another important object of the invention is to provide a method of perforating a strip of filter material which utilizes a generally conical perforator and in which the perforator is forced through the strip progressively greater distances as the perforating operation progresses from one end of the strip toward the other, whereby the perforations progressively increase in size toward said other end of the strip.

A related object is to employ a rollable die or die element provided with a plurality of rows of generally conical perforators, the rollable die element being rolled over the strip of filter material from one end thereof to the other and the perforators being forced through the strip progressively greater distances as the perforating operation progresses toward said other end of the strip, whereby parallel rows of progressively larger perforations are produced in the strip, which is an important feature. In actual practice, the strip of filter material is moved past a stationary rollable die element so that the latter rolls along the strip as the strip moves. However, the strip may be stationary and the rollable die element may be rolled therealong by moving it bodily relative to the strip. The rollable die element may be either a drum which carries the perforators, or it may be an endless belt which carries them.

Another object of the invention is to provide such a rollable die element wherein the center-to-center spacings of the perforators in the rows are at least substantially equal so that the center-to-center spacings of the resulting perforations in the strip of filter material are also at least substantially equal.

Another object is to provide an apparatus which includes the foregoing rollable die element and another die element of yieldable material which is penetrable by the perforators, the strip of filter material preferably being moved between the two die elements so that the perforators pierce the strip and penetrate the die element of yieldable material. The latter die element may be formed of any suitable material, a material of a rubberlike nature being an example.

Another object is to provide an apparatus which includes means for moving one of the die elements toward or away from the other as the strip of filter material is moved therebetween so as to progressively increase or decrease the sizes of the perforations formed in the strip as the perforating operation progresses from one end of the strip to the other.

A further object is to provide means for continuously moving the strip and the two die elements along the path of movement of the strip at corresponding speeds so as to avoid tearing of the filter material, the die element of yieldable material preferably being in the form of a belt on which the strip of filter material rests.

Another object is to provide an apparatus which includes means for moving the die elements toward each other and then away from each other repeatedly, each cycle of relative movement of the two die elements thus producing two filter strips in which the perforations respectively increase and decrease in size. These filter strips may be wound into tubular rolls as required to accommodate either inward or outward flow of the liquid being filtered.

The perforators are preferably generally conical spikes on the surface of the drum or belt, although the points of the spikes may be flattened if desired. Also, the flattened points of the spikes may be rendered concave to make them similar to the punching elements of conventional leather punches, thereby insuring that the smaller perforations and at least the centers of the larger perforations will be punched out cleanly, which is an important feature of the invention.

The foregoing advantages, features and objects of the present invention, together with various other advantages, features and objects thereof which will become apparent, may be attained with the exemplary embodiment of the invention which is illustrated in the accompanying drawings and which is described hereinafter.

Referring to the drawings:

Fig. 1 is a diagrammatic, perspective view of an apparatus of the invention capable of performing the method and of producing the product of the invention;

Figs. 2, 3 and 4 are fragmentary sectional views illustrating the progressive perforating operation hereinbefore discussed;

Fig. 5 is a view of a completed filter element of the invention, portions of the element being broken away to reveal the internal structure thereof;

Fig. 6 is an enlarged, fragmentary sectional view of the completed filter element of the invention; and Fig. 7 is an elevational view of a preferred form of rollable die element.

Referring to Fig. 1 of the drawings, the apparatus illustrated therein includes an electric motor 10 which drives a shaft 11 having a pulley 12 mounted thereon, a belt 13 being entrained around the pulley 12 and around a pulley 14 on a shaft 15 which drives a flexible shaft 16. The latter drives a shaft 17 which is adapted to receive a perforated tubular core 18 (Figs. 1 and 5) in driving relation. Wound around the core 18 is a perforated strip 19 of filter material which is perforated in accordance with the invention in a manner to be described, the strip 19 being fed from a supply roll 20 mounted on a shaft 21. The foregoing elements are carried by a frame designated generally by the numeral 22, the various shafts being mounted in suitable bearings carried by the frame.

The strip 19 of filter material passes over and rests on a die or die element 26 of yieldable material which, in the particular construction illustrated, takes the form of a belt 27 trained around rollers 28 rotatably mounted of the frame 22. The belt 27 may be formed of any suitable material, such as relatively hard and tough rubber, for example, which may be suitably reinforced by reinforcing material, not shown, embedded therein. Also, other materials may be used for the belt 27 without departing from the spirit of the invention, so long as such materials are penetrable by perforators to be described.

The strip 19 of filter material passes between the die 26 and a rollable or die element 31 which includes a rotor or drum 32 mounted on a shaft 33 which is rotatable in bearings at the ends of arms 34. The latter are carried by a shaft 35 which is rotatable in bearings carried by the frame 22 so that the drum 32 may move toward and away from the die 26 to progressively vary the sizes of perforations formed in the strip 19 in a manner to be described.

Mounted on the periphery of the drum 32 are parallel, circumferential rows of generally conical perforators 40, the latter being generally conical, pointed spikes in the particular construction illustrated. The perforators 40 in each row are so arranged that their center-to-center spacings are at least substantially equal around the entire circumference of the drum 32. The drum 32 is driven by a gear 41 which is fixed on the drum shaft 33, the gear 41 meshing with a gear 42 which is eccentrically mounted on the shaft 11 of the motor 10. Thus, as the motor rotates the shaft 11 and the eccentric gear 42 thereon, the gear 42 rotates the die 31 and, at the same time, progressively moves it toward and away from the die 26, the rollable die 31 moving toward and away from the die 26 once for each revolution of the eccentric gear 42 to complete one cycle of such relative movement.

Thus, with the structure described above, the strip 19 of filter material and the rollable die 31 are driven in synchronism, the linear speed of the strip 19 and the peripheral speed of the die 31 being equal to avoid tearing the strip 19 as perforations are formed therein by the perforators 40 in a manner to be described. The belt 27 is freely movable so that it moves along with the strip 19 at the same speed, such movement of the belt being produced by the perforators 40, which penetrate the material of the belt, as will be described.

As the strip 19 of filter material is moved between the dies 26 and 31, the perforators 40 of the die 31 pierce the strip of filter material to form parallel rows of perforations therein the sizes of which progressively increase as the die 31 moves toward the die 26, the rows of progressively larger perforations 45 being clearly shown in Fig. 1 of the drawings. Similarly, as the die 31 moves away from the die 26, the perforations 45 progressively decrease in size. The action of the perforators 40 is best shown in Figs. 2, 3 and 4, wherein one of the perforators is shown producing perforations of progressively increasing size as the die 31 moves toward the die 26. In Fig. 2, the die 31 is spaced from the die 26 so that the perforator 40 shown penetrates only slightly into the yieldable material of the die 26 to produce a relatively small perforation 45. In Fig. 3, the die 31 is closer to the die 26 so that the perforator 40 shown penetrates further into the yieldable material of the die 26, thereby producing a larger perforation 45. Similarly, in Fig. 4, the die 31 has been moved toward the die 26 sufficiently to bring the surface of the drum 32 into contact with the strip 19, whereby the perforator 40 shown penetrates the yieldable material of the die 26 to the maximum extent to produce a perforation 45 of maximum size.

When the perforators 40 pierce the strip 19 and penetrate the yieldable material of the die 26, the material of which the strip 19 is formed is displaced downwardly and laterally, the material tending to tear somewhat to form a plurality of tabs ringing the perforation. Some of these tabs are pinched by the yieldable material of which the die 26 is formed when the perforators are withdrawn, such tabs subsequently being torn off to provide relatively clean perforations when the strip 19 and the die 26 separate. Others of such tabs may be folded under when the strip 19 is subsequently wound into a tubular roll, while others are crumpled up at the edges of the perforation. The net result is a generally circular perforation having somewhat irregular edges. When the perforated strip 19 is wound up into a roll, the perforations 45 may tend to become reduced in size to some extent because of the radially inward movement of tabs which are compressed by the winding operation. Consequently, it is necessary to make the perforations 45 somewhat larger initially to allow for such contraction thereof during the winding operation. The contraction varies considerably from one material to another, but, in general, it will probably be necessary to make the perforations 45 from one to two times as large initially as the desired final size to allow for such contraction during winding. Also in some instances, the tabs around a particular perforation which are formed during the piercing operation may completely close the perforation during winding. However, such a perforation, even though closed, still functions as a passage for the liquid being filtered since the structure of the strip 19 is destroyed to an extent sufficient to permit passage of the liquid.

As an alternative construction to that shown, the perforators 40 may be provided with blunt or flat ends which tend to punch out the smallest perforations and at least the centers of the larger perforations cleanly so as to minimize the hereinbefore discussed contraction of the perforations during winding. If desired, such blunt ends of the perforators 40 may be rendered concave so that the perforators operate in the manner of the punching elements of a conventional leather punch so as to punch out the smallest perforations and at least the centers of the larger perforations cleanly. With the blunt-ended or concave-ended perforators of generally conical configuration, contraction of the perforations is held to a minimum, which is an important feature.

While smaller or larger perforations 45 may be employed in some instances, as a practical matter, I prefer to make the perforations 45 at least 1/16 of an inch in diameter and not more than 3/8 of an inch in diameter after winding. In order to obtain the maximum perforation size, it will ordinarily be necessary to employ perforators 40 which are somewhat larger at their bases to compensate for contraction of the perforations upon winding, the amount of contraction upon winding varying with the material of the strip 19 as discussed above.

Various commercially available filter materials may be employed in practicing the invention, such as commercially available filter papers. Examples of such papers are newsprint, blotting type filter papers, kraft toweling, and the like. One advantage of kraft toweling in particular is that this material is ribbed or creped so that, when a perforated strip thereof is wound into a tubular roll, the ribs tend to produce minute spaces between convolutions which operate with a riffle effect, foreign matter or other material to be removed from the liquid being filtered being trapped in such riffles.

In Fig. 1 of the drawing, in order to show clearly the progressively varying perforation sizes, the entire range of perforation sizes has been shown on a relatively short length of the strip 19. In actual practice, the entire range of perforation sizes is spread over a very long section of the strip 19, such section being long enough to provide the desired diameter for the filter element when it has been wound up into a tubular roll. Consequently, the particular gear ratio illustrated in Fig. 1 for the drive for the drum 32 would not be used. In other words, the drum 32 would not be moved toward and away from the die 26 as rapidly as the construction illustrated in Fig. 1 provides. As will be apparent, by moving the drum 32 toward and away from the die 26 very slowly as compared to the speed of the strip 19, the entire range of perforation sizes may be spread out over the length of strip necessary to provide the finished product with the desired diameter. The changes necessary to produce such relatively slow movement of the drum 32 toward and away from the die 26 can readily be made by those skilled in the art without departing from the spirit of the invention, it being understood that the particular apparatus illustrated has been selected solely for convenience in disclosing the invention with no intention of limiting the invention thereto.

A preferred form of rollable die is indicated by the numeral 51 in Fig. 7 of the drawing and comprises a rotor having the form of an endless belt 52 carrying the parallel rows of perforators 40, the belt 52 being trained around rollers 53 which are carried by arms 54 on the shaft 35 so that the die 51 can move up and down relative to the strip 19 as previously described. One of the rollers 53 is fixed on a shaft 55 which carries the gear 41 described earlier, this gear meshing with the eccentric gear 42 to drive the rollable die 51 and to move it toward and away from the strip 19.

The advantage of the rollable die 51 is that it withdraws the perforators 40 from the strip 19 in such a way as to avoid tearing the strip, particularly if the die 51 is inclined slightly relative to the strip, as shown, so that the perforators are withdrawn substantially axially from the perforations 45, which is an important feature.

As the perforated strip 19 is withdrawn from between the dies 26 and 31, or from between the dies 26 and 51, it is wound on the perforated core 18, or equivalent, through the driving connection hereinbefore described. If it is desired to produce a filter element designed to handle radially inward flow of the fluid being filtered, the end of the strip 19 which contains the smallest perforations 45 is first wound on the core, the perforations progressively increasing in size as succeeding convolutions are wound. The resulting structure is illustrated in Fig. 5 of the drawing, it being noted that the perforations 45 in the convolutions of the wound strip 19 progressively decrease in size from the outside of the tubular roll to the inside thereof. Thus, as discussed above, the capacity of the filter for foreign matter or other materials to be removed progressively decreases toward the center as the need for such capacity progressively decreases. At the same time, the separation between perforations progressively increases toward the center of the tubular roll so that the filtering efficiency progressively increases. The net result is that the larger particles requiring maximum space are taken out first, and the smallest particles, requiring minimum space and maximum filtering efficiency, are taken out last, the intermediate particles being progressively taken out in between.

With a filter element designed to handle flow in the opposite direction, i. e., from the center of the tubular roll to the exterior thereof, the perforated strip 19 is wound in reverse order. In other words, the end containing the largest perforations is wound on the core first so that the end containing the smallest perforations is on the outside. In all other respects, the operation is similar.

Supplementing the foregoing general discussion of the flow through the completed filter element, it should be pointed out that the perforations 45 in adjacent convolutions do not register with each other, although occasional instances of partial or complete registry may be found. However, in all but a few instances, the perforations in one convolution will not register with the perforations in the adjacent convolutions. Thus, the liquid being filtered follows a rather devious path in flowing from the exterior of the element to the interior thereof, or vice versa, as the case may be.

In general, the flow is radial, but as the liquid flows through a particular perforation, it must find its way to another perforation in the next convolution, and, in so doing, it will tend to seek the nearest perforation in the adjacent convolution. This may require the liquid to flow circumferentially to the nearest perforation in the adjacent convolution, or it may flow axially to reach the nearest convolution, depending upon the relative locations of the perforations in adjoining convolutions. By the time the liquid has made its way through the entire element, it will have traversed the minute spaces between convolutions so many times that all solid particles therein will have been removed, the finest particles being removed toward the end of the flow path since the smallest perforations are quite widely separated by solid portions of the spiral perforated strip 19, this being due to the substantially uniform center-to-center spacing hereinbefore discussed.

While I have suggested particular applications of the present invention and have disclosed specific embodiments of the method, apparatus and product thereof, it will be understood that other applications of the invention are possible and that various changes, modifications and substitutions may be made in the specific embodiments disclosed, all without necessarily departing from the spirit of the invention.

I claim as my invention:

1. In an apparatus for perforating a strip of filter material for use in a filter element, the combination of: a pair of dies one of which is movable toward and away from the other, one of said dies comprising a rotor having thereon a plurality of circumferential rows of generally conical perforators; means for rotating said rotor; means for moving said strip between said dies at a speed corersponding to the peripheral speed of said rotor, whereby said perforators penetrate said strip to form parallel rows of spaced perforations therethrough; and means for progressively moving said movable die relative to the other so as to progressively change the sizes of said perforations.

2. An apparatus according to claim 1 wherein the center-to-center spacings of the perforators in each row on said rotor are substantially equal so that the center-to-center spacings of the resulting perforations in each row in said strip are substantially equal.

3. An apparatus according to claim 2 wherein said die other than said perforator-carrying rotor is formed of a yieldable material which is penetrable by said perforators.

4. In an apparatus for perforating a strip of filter material for use in a filter element, the combination of: a rollable die element having on its periphery at least one row of outwardly extending, circumferentially spaced, generally conical perforators adapted to pierce said strip; a die element of yieldable material disposed adjacent said rollable die element and adapted to be penetrated by said perforators; means for mounting one of said die elements for progressive movement toward and away from the other to vary the distance which said perforators penetrate said yieldable die element; means for rotating said rollable die element; means for moving said strip between said die elements at a speed corresponding to the peripheral speed of said rollable die element, whereby said perforators produce a row of perforations in said strip which extends lengthwise of said strip; and means for progressively moving said movable die element relative to the other to progressively change the size of the perforations in said row in said strip.

5. An apparatus as defined in claim 4 wherein the center-to-center spacings of said perforators are substantially equal so that the center-to-center spacings of said perforations in said row in said strip are also substantially equal.

6. An apparatus according to claim 4 wherein said yieldable die element comprises a movable element of yieldable material.

7. An apparatus according to claim 4 wherein said yieldable die element comprises a movable belt of yieldable material.

8. An apparatus as in claim 4 wherein said rollable die element is a drum.

9. An apparatus as in claim 4 wherein said rollable die element is a belt.

References Cited in the file of this patent

UNITED STATES PATENTS

| 117,100 | Morse | July 18, 1871 |
| 226,622 | Moody | Apr. 20, 1880 |
| 404,582 | Wheeler | June 4, 1889 |
| 995,868 | Housam | June 20, 1911 |
| 1,044,283 | Stanger | Nov. 12, 1912 |
| 1,260,694 | Marresford | Mar. 26, 1918 |
| 1,688,258 | Young | Oct. 16, 1928 |
| 1,714,583 | Anthony | May 28, 1929 |
| 1,912,495 | Phelan | June 6, 1933 |
| 2,371,734 | Buttress | Mar. 20, 1945 |
| 2,390,072 | Beaton | Dec. 4, 1945 |
| 2,445,843 | Turner | July 27, 1948 |
| 2,522,154 | Asmussen | Sept. 12, 1950 |
| 2,547,857 | Cook | Apr. 3, 1951 |
| 2,569,745 | Cook | Oct. 2, 1951 |